3,444,098
METHODS OF MAKING COMBUSTION CATALYSTS

Henry Bottazi, Bernard Claudel, and Yves Trambouze, Villeurbanne, and Alain de Calmes, Henry Fould, and Pierre Yves Ledoray, Fontenay-aux-Roses, France, assignors to The Commissariat à l'Energie Atomique, Paris, France, a society of France
Filed Mar. 29, 1963, Ser. No. 268,947
Claims priority, application France, Mar. 5, 1963, 926,905
Int. Cl. B01j *11/06*
U.S. Cl. 252—455                                   12 Claims The present invention relates to catalysts for the combustion of gases and it is more especially concerned with catalysts to be used in after-burners for the exhaust gases of engines such as internal combustion engines or other thermal engines, of furnaces, ovens, etc.

The object of the present invention is the preparation of such a catalyst by a method which is better adapted to meet the requirements of practice than those used up to this time.

Our invention consists chiefly in preparing thoria by heating of a thermally decomposable thorium salt such as thorium nitrate or oxalate, possibly in the presence of a compound, capable of being decomposed by heat, of an element chosen among transition elements, such as uranium nitrate, or from the group of lanthanides, such as cerium nitrate, in proportions such that the percentage of oxide of said element with respect to the thorium oxide ranges from zero to some units percent, and preferably averages 1%, the rate of heating that is adopted ranging from 2° C. to about 10° C. per minute, and being preferably equal to 8° C. per minute, this heating being pursued up to a temperature ranging from 280° C. to 600° C., the heated products being kept at the final heating temperature for a long time, preferably at least ten hours.

The most common thorium salts, such for instance as the nitrate and the oxalate, are well adapted for carrying out the invention. When these salts are heated, they decompose so as first to give intermediate products. The final decomposition products, to wit thoria is obtained only at a temperature above 280° C.

When these thorium salts, either taken alone or on a support, are heated in such manner that their temperature rises from 2° C. to 10° C. per minute, we obtain, when heating is stopped at a temperature ranging from 280° C. to 600° C. a thoria which is catalytically active with respect to imperfectly burned gases.

However, the products of thermal decomposition must be subjected to the final heating temperature for a relatively long time, generally at least ten hours, in order to obtain a pure thoria free from anions.

It will be noted that the catalytic power of the thoria that is obtained is maximum if the rate of heating is about 8° C. per minute and, when starting from thorium salts taken alone, when the final temperature remains between about 280° C. and 320° C.

The heating characteristics are narrowly connected with the passage of the various thorium salts through various hydration steps. Passage from the thorium nitrate through the step of pentahydrate is very advantageous because it permits of obtaining a thoria having a high catalytic power. This pentahydrate is in the form of small agglomerates, the grain size of which averages 0.5 mm., this grain size being besides variable with the hygrometric degree of atmospheric air, due to the hygroscopicity of this salt.

The thoria that is obtained is in the form of small porous grains, the specific area of which averages 65 m.$^2$ per gram or 30 m.$^2$ per gram according as the starting material is nitrate or oxalate, respectively.

The pure thoria that is thus obtained constitutes an excellent catalyst to finish the combustion of the non burned portions of the exhaust gases of an engine. Advantageously this thoria will be used on a support.

However, although thoria already constitutes by itself an excellent catalyst for the after-burning of exhaust gases, its activity will be still enhanced by the addition of an activating or promoting agent. As promoting agent we may use elements chosen among transition elements or rare earths. Thus, it is advantageous to add to the thorium nitrate, previously to the thermal treatment thereof, a small amount of cerium nitrate. This last mentioned body is without influence on the course of the reaction, in view of the fact that it syncrystallizes with thorium nitrate, or on the final surface state of the thoria that is obtained.

Although the presence of the promoting substance is not quite necessary and its concentration in thoria may be very variable and as high as some units percent, it was found that the best results were obtained when the concentration of said addition element averages 1% (calculated as oxide). When the addition element that is chosen consists of cerium oxide the maximum activation effect is obtained when its percentage in thoria reaches 0.96%.

According to an advantageous form of the invention the catalyst is prepared directly on its support by impregnating the support with a solution of the salt to be decomposed, for instance thorium nitrate, evaporating the solvent, and performing the thermal decomposition in the conditions above described. In this form of the invention the size of the grains of thorium nitrate after evaporation of the solvent depends upon the rate at which this evaporation takes place and which must anyway be slow. This evaporation may, for instance, be produced, in a low temperature oven, over a period of 24 hours.

If the rate of the heating that follows, in order to perform the thermal decomposition, may be of the same order of magnitude as in the case where the catalyst is prepared alone, the tolerances concerning the heating temperature are wider. The minimum heating temperature remains equal to 280° C. but the maximum temperature not to be exceeded in order to avoid a drop of the catalytic power averages 600° C.

When the catalyst thus prepared is placed across the path of travel of the exhaust gases flowing out from an engine or a boiler, we obtain a remarkable purification of these gases.

When thoria is used alone, in the absence of an activating agent such as above described, it is found that, whatever be the shaping that is adopted, it ensures in all cases complete oxidizing of all the unburnt hydrocarbon of said exhaust gases and of a great proportion of the carbon oxide that is present. This proportion of oxidized carbon oxide at the beginning of the reaction, increases with the temperature at which thoria is preheated. It is already higher than 50% for a preheating at 300° C.

When the thoria that is used as catalyst contains a small amount of activating agent such as cerium oxide, we obtain already at a temperature from 300° C. to 400° C., a nearly total oxidizing of the carbon oxide present in the exhaust gases.

The chief advantage of this catalytic thoria with respect to known catalyst for the after-burning of exhaust gases, such as iron, cobalt, nickel, platinum, vanadium compounds, lies in its catalytic activity which always increases with the temperature. Increase of the temperature is unavoidable due to the exothermic character of said after-burning. It involves a quick deactivation of the known catalysts and their poisoning due to the presence in the exhaust gases of sulfur and lead tetraethyl and consequently a reduction of their activity which requires their frequent replacement. On the contrary, thoria according to the invention is not sensitive to poisoning agents even when it is overheated during its use to 600° C., at which temperature its catalytic activity is not altered.

In what follows, we will describe various embodiments of the invention.

In order to bring into evidence the catalytic action of thoria obtained according to the invention we provide an experimental device including an internal combustion engine of a cylinder capacity of 175 cm.³, of the four strokes type, fed with ordinary gasoline and adjusted in such manner that the exhaust gases contain a relatively high proportion of carbon monoxide, ranging for instance from 8% to 10%. This experimental device further comprises, at 1 m. from the engine, a reactor containing the catalyst, preferably placed on a support. Gas samples are collected respectively at the outlet of the engine, before the exhaust gases enter the reactor and at the outlet of said reactor. The samples thus collected are analyzed by chromatography in the gaseous phase and by mass spectrometry. We provide, at different points of the reactor, thermocouples for measuring the rises of temperature in said reactor due to the catalytic oxidizing of the exhaust gases in the presence of thoria.

Preparation of the catalyst directly upon its support may be effected in various conditions.

By way of example the catalyst may be prepared on a support consisting of porous balls of alumina. These balls are stirred for one hour with a solution containing for instance 400 gr. per liter of hydrated thorium nitrate and after drying they are heated at 300° C., the rate of heating being equal to 8° C. per minute. Said balls are then kept at this temperature of 300° C. for ten hours.

According to other advantageous process according to the invention, we use for the support, instead of alumina asbestos, for instance in the form of a fabric of 0.5 mm. which is impregnated with a solution of thorium nitrate, subsequently treated thermally in the same conditions as in the preceding case.

The catalytic efficiency of this asbestos fabric loaded with thoria is brought into evidence in the above described experimental device. When this fabric, placed in the reactor, is kept at a temperature of 300° C. and we pass through this reactor the exhaust gases coming from the engine, we observe in the reactor, due to contact with thoria, a supplementary combustion which raises the temperature of said catalyst to above 400° C. Analysis of gaseous samples collected at the outlet of the reactor shows that the percentage of combustion of the carbon monoxide is about 55% and that of the hydrocarbon about 100%.

A supplementary advantage of the formation of the catalyst directly upon the asbestos support lies in the possibility, at the same time as the thorium salt is thermally decomposed, of giving the asbestos support any shape whatever, forming for instance, discs, bars and so on.

The invention will now be described with reference to the appended drawings, given merely by way of example, and in which.

Figure 1:
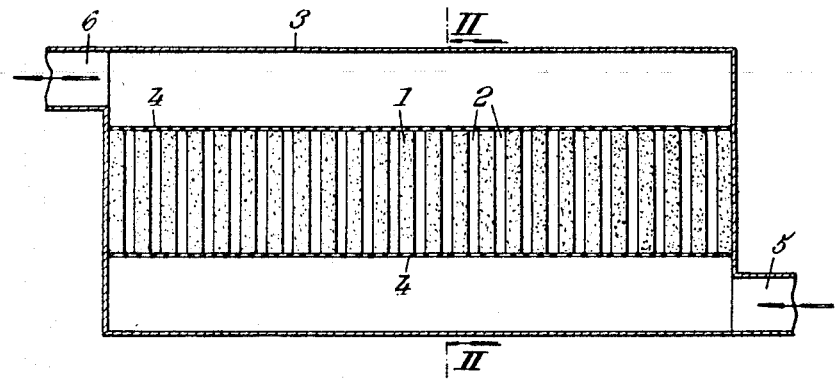
FIG. 1 is a transverse section of the catalytic device according to the invention.
Figure 2:
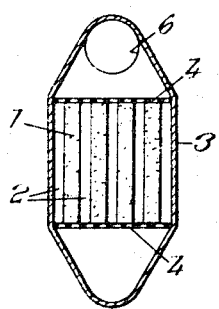
FIG. 2 is a section of the device of FIG. 1 on the line II—II thereof.

In the construction illustrated by FIGS. 1 and 2, the support consists of an asbestos parallelepipedon 1 provided with resistance wires (not shown) obtained by impregnating asbestos waste with a solution of 500 gr. per liter of thorium nitrate and placing this impregnated waste in a steel mould containing solid parallel bars, so as to provide channels 2 in the support that is subseuently formed and to clear the armature from the resistor wires which must serve to heating. The whole is slowly heated up to 350° C. at which temperature it is kept for twenty-four hours.

A rigid block is thus obtained, which is placed in a reactor 3, between sustaining grids 4. The exhaust gases, coming from an engine, for instance such as above described, enter reactor 3 at 5, pass through channels 2 provided in the support containing the catalyst and flow out at 6. The above mentioned channels 2 have for instance a length of 100 mm. Thus we obtain a good contact between the catalyst and the exhaust gases.

If, before the passage of the exhaust gases to be purified, the support is heated to a temperature of 300° C., we then obtain, when passing said gases through the reactor a complete combustion of the solid particles and of the hydrocarbons and the percentage of oxidizing of the carbon monoxide averages 57%. After a preliminary heating to 400° C. this percentage reaches 75%. This efficiency may still be increased because a prolonged overheating at 600° C. does not produce an alteration of the catalyst.

Figure 3:
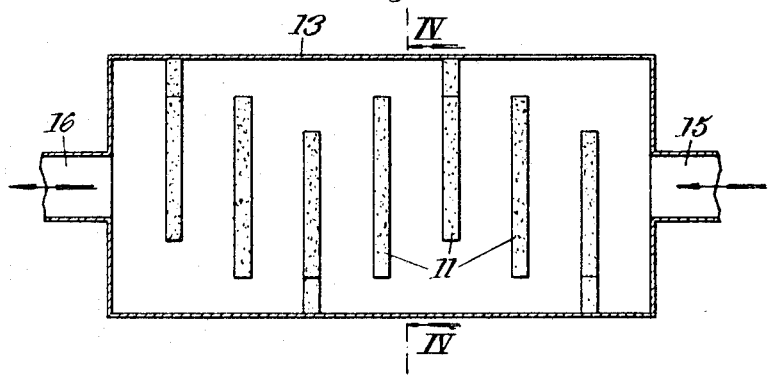
FIG. 3 is also a transverse section of a catalysis device made according to another form of the invention.
Figure 4:
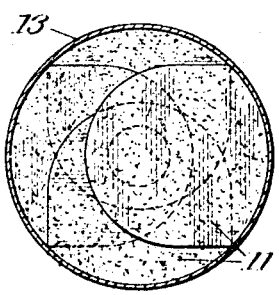
FIG. 4 is a cross section of this catalysis device on the line IV—IV of FIG. 3.

FIGS. 3 and 4 show another example of the invention making it possible to ensure an efficient contact between the catalyst and the incompletely burnt exhaust gases from the engine.

The support containing the catalyst consists of plates 11 of asbestos limited by circular arcs and mounted to form a baffle arrangement inside a cylindrical reactor 13 of a cross section a little greater than the area of each of said plates 11. The position of each of the plates 11 in vessel 13 is deduced from the position of the preceding plate by a translation and a rotation of 90°. Plates 11 have, for instance, a thickness of 5 mm. and are located at a distance of 20 mm. from one another. The diameter of the reactor may be equal for instance to 80 mm. The exhaust gases which enter at 15 are compelled to flow along the successive plates 11 before issuing at 16, after purification.

Plates 11, which contain the catalyst, may be prepared in the same manner as in the preceding embodiment, from nitrate of thorium alone so as to obtain equivalent results.

In both of the arrangements which have been described still better results are obtained if the initial support also contains a small amount of an activating agent, for instance 8.7 gr. of cerium nitrate for 750 gr. of thorium nitrate. When the reactor has an initial temperature ranging from 300° C. to 400° C. the rate of oxidizing of the carbon monoxide is higher than 90%, the rate of combustion of hydrocarbon solid particles being still 100%.

We may also advantageously use uranyl nitrate

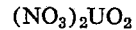

as activating agent for catalysis.

For instance, we may impregnate the above mentioned asbestos support with a solution containing 5.4 gr. of uranyl nitrate for 750 gr. of thorium nitrate

If, after the catalytic thorium is being formed in the conditions above described on the asbestos support, said support is placed in a reactor and brought to a temperature of 500° C. before the passage of the gases to be purified, it is found that the percentage of oxidizing of carbon monoxide reaches 86%, that corresponding to the oxidation of the hydrocarbon still reaching 100%.

The catalysis apparatus may be very easily mounted for instance on a motor car. The temperature of the exhaust gases coming from the engine will be sufficient in all cases for starting the after-burning reaction as above described. We may also coat the silencer of a motor car with this catalyst consisting chiefly of thoria. In all cases, it is, of course, necessary to provide sufficient air intakes to permit after-burning to take place effectively.

Of course, the catalyst obtained according to the invention may be employed in many other applications, in particular for the combustion itself.

It may be incorporated in refractory bricks in order to obtain perfect combustion inside ovens.

Figure 5:
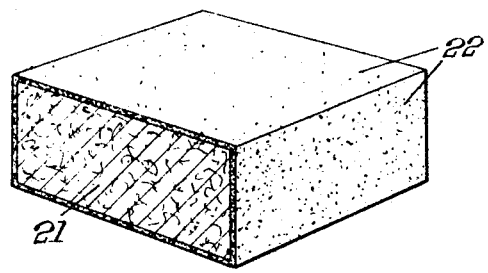
FIG. 5 is a perspective view, partly in section, of a brick provided with the catalyst according to the invention.

In the case where these refractory bricks 21 (FIG. 5) are not very porous by themselves care will be previously taken of providing one or several faces 22 thereof with a deposit of a porous material such as zirconia or alumina fixed or secured to said faces through any known method. If this layer is to consist itself of a refractory material, this material may be applied to the faces of bricks 21 for instance by means of a plasma jet device where the material in question has been introduced in powdery form.

The brick having porous faces thus constituted is then impregnated with a solution of thorium nitrate and heated, first to evaporate the solvent, then to transform the thorium nitrate into catalytic thoria, up to a temperature averaging 300° C. and at the rate of temperature increase of 8° C. per minute.

Figure 6:
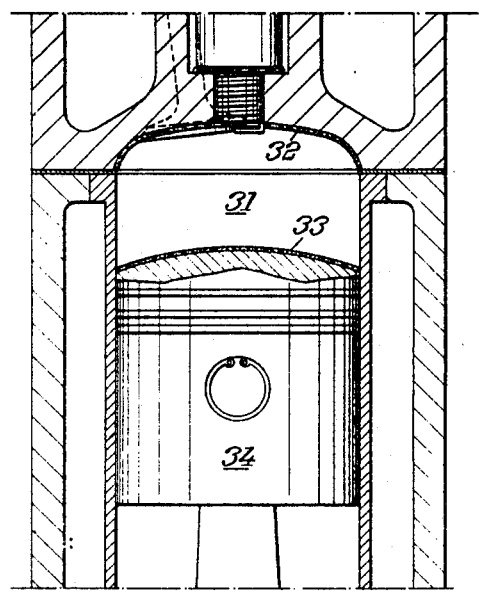
FIG. 6 is a transverse section through the cylinder of an internal combustion engine, a portion of which is coated with the catalyst according to the invention.

The efficiency of internal combustion engines may be increased by coating some portions of the combustion chamber 31 thereof (FIG. 6), for instance, the tops 32 of the cylinder and/or the upper surfaces 33 of piston 34, with thoria according to the invention. This may be effected by forming a porous deposit on said surfaces, for instance, in a manner analogous to that above described for refractory bricks. The surfaces thus treated may then be impregnated with the solution of thorium nitrate, which is subsequently transformed into catalytic thoria as above stated.

In likewise manner the efficiency of jet engines may be improved by coating with thoria the inner surface of the nozzles thereof.

When use is made, in these jet engines, of nozzles made of a plastic material, these nozzles may be reinforced by fibers of thoria which also serve to improve the combustion in said nozzles.

What we claim is:

1. A method of making a catalyst which comprises starting from a thorium salt easy to decompose thermally, heating this salt at a rate ranging from 2° C. per minute to 10° C. per minute, this heating being conducted up to a temperature ranging from 280° C. to 600° C. and keeping the heated products at the final heating temperature for at least ten hours.

2. A method according to claim 1 wherein said salt is thorium nitrate.

3. A method according to claim 1 wherein said salt is thorium oxalate.

4. A method according to claim 1 wherein said rate of heating is 8° C. per minute.

5. A method according to claim 1 wherein said thorium salt is heated in the presence of a small amount of a compound, capable of decomposing under the action of heat, of an element chosen among transition elements and lanthanide elements.

6. A method according to claim 5 wherein said compound, calculated as oxide, is present in an amount of about 1 percent, calculated on said thorium salt.

7. A method according to claim 1 wherein the heating of said thorium salt takes place to a temperature ranging from 280° C. to 320° C.

8. A method according to claim 5 wherein the heating of the mixture of thorium salt and of said compound takes place at a temperature ranging from 280° C. to 600° C., in the presence of a support.

9. A method according to claim 8 wherein said support is made of alumina.

10. A method according to claim 8 wherein said support is made of asbestos.

11. A method according to claim 8 wherein said support is made of a refractory material.

12. A method according to claim 6 wherein said compound is a cerium compound.

References Cited

UNITED STATES PATENTS

| | | | |
|---|---|---|---|
| 1,198,542 | 9/1916 | Harding | 252—469 |
| 1,698,009 | 1/1929 | Weber | 252—454 X |
| 2,099,325 | 11/1937 | Zellmann et al. | 23—14.5 |
| 2,202,637 | 5/1940 | Muller et al. | 252—454 X |
| 3,214,238 | 10/1965 | Rombau et al. | 252—461 X |

OTHER REFERENCES

Cannon et al.: "I. & E. C. Product Research and Development," vol. 1, No. 3, September 1962, pages 152–156.

PATRICK P. GARVIN, *Primary Examiner.*

U.S. Cl. X.R.

23—2; 252—462, 463